United States Patent [19]

Maeda et al.

[11] Patent Number: 5,119,391

[45] Date of Patent: Jun. 2, 1992

[54] AUTOMATIC FREQUENCY CONTROL CIRCUIT FOR COHERENT DIVERSITY RECEPTION

[75] Inventors: Hidenari Maeda; Hiroyuki Yamazaki, both of Tokyo, Japan

[73] Assignee: Oki Electric Industry Co., Ltd., Tokyo, Japan

[21] Appl. No.: 640,081

[22] Filed: Jan. 11, 1991

[30] Foreign Application Priority Data

Jan. 16, 1990 [JP] Japan .................................. 2-006910

[51] Int. Cl.⁵ .............................................. H01S 3/13
[52] U.S. Cl. ...................................... 372/32; 372/20; 372/28; 372/38
[58] Field of Search .................... 372/32, 28, 20, 38

[56] References Cited

U.S. PATENT DOCUMENTS

| | | | |
|---|---|---|---|
| 4,468,773 | 8/1984 | Seaton | 372/32 |
| 4,700,352 | 10/1989 | Shikada et al. | 372/20 |
| 4,905,244 | 2/1990 | Wyeth et al. | 372/32 |
| 4,916,705 | 4/1990 | Glance | 372/20 |
| 4,918,700 | 4/1990 | Gambini | 372/32 |
| 4,977,564 | 12/1990 | Ryu et al. | 372/32 |

FOREIGN PATENT DOCUMENTS 2185619  7/1987  United Kingdom.

OTHER PUBLICATIONS

Wilson et al., "Optical Communication Systems", Optoelectronics, An Introduction, School of Physics, Newcastle upon Tyne polytechnic, pp. 378-381, Jan. 1983.

Primary Examiner—Georgia Y. Epps
Attorney, Agent, or Firm—Spencer, Frank & Schneider

[57] ABSTRACT

In an optical heterodyne receiver having a local oscillating light source controlled by a driver circuit and which uses a polarity diversity technique thereby producing first and second intermediate frequency signals, an automatic frequency control circuit (AFC) controls the driver circuit by generating an error signal. The AFC includes two power regulators for generating respective fixed power signals based on the two intermediate frequency signals. The AFC also includes two detectors for converting the fixed power signals to corresponding voltage signals based on their frequency; two control circuits for providing respective logic signals based on the fixed power signals; first and second switching circuits which enable/disable a respective detector in response to the logic signal from the respective control circuits; a third control circuit which generates an AND signal based on the logic signals from the control circuits; and an amplifier for generating the error signal by comparing a reference voltage and the voltage signals from the detectors, the amplifier changing an amplification factor in response to the AND signal from the third control circuit.

4 Claims, 11 Drawing Sheets

AUTOMATIC FREQUENCY CONTROL CIRCUIT FOR COHERENT DIVERSITY RECEPTION

REFERENCE TO RELATED APPLICATIONS

This application claims the right of priority under 35 U.S.C. 119 of Japanese Application Serial No. 6910/90, filed on Jan. 16, 1990, the entire disclosure of which is incorporated herein by reference.

BACKGROUND OF THE INVENTION

1. Field of the Invention

This invention relates to an automatic frequency control circuit utilized in an optical heterodyne receiver using a polarization diversity technique.

2. Background Information

In optical communication technology, for example, in high-capacity optical cable TV broadcasting technology, a coherent FDM broadcasting system has been studied. In such system, an optical heterodyne receiver unit with a polarization diversity technique is featured to reduce the influence of signal polarization fluctuation.

Further, according to the technique, it is very important to control accurately an oscillating frequency of a local light source device (i.e. a laser diode module) in the optical heterodyne receiver unit for heterodyne reception in order to obtain higher reception sensitivity and a broader tuning range. Therefore, there has been a need to provide a highly accurate automatic frequency control circuit.

FIG. 1 illustrates an example of a general block diagram of a conventional automatic frequency control circuit utilized in a coherent diversity receiver unit. This circuit comprises three main circuit portions, namely a first frequency detector portion 2-A including a first delay line 4-A and a first double balanced mixer 6-A, a second frequency detector portion 2-B including a second delay line 4-B and a second double balanced mixer 6-B, and an adder circuit 8. An output from the adder circuit is applied to a light source driver circuit 10 to control the frequency of a local light source device. (not shown)

In an optical heterodyne receiver using a polarization diversity technique, after receiving which have diversity signals having a different polarity from each other, a first intermediate frequency signal IF1 and a second intermediate frequency signal IF2 which are produced by respective receiver modules (not shown) are inputted to input terminals 12-A and 12-B of the automatic frequency circuit respectively.

Each of the intermediate frequency signals IF1 and IF2 is converted to a corresponding voltage signal by frequency detector portions 2-A and 2-B respectively, and the voltage signals are added to each other in the adder circuit 8. Because this circuit adds both intermediate frequency signals after conversions to corresponding voltage signals, it is possible to obtain a voltage signal output which is independent of the phase relationship between the original intermediate frequency signals IF1 and IF2.

Therefore, the output signal from the adder circuit 8 can be used as an error signal to control the local light source device (not shown) with a light source driver circuit 10 for heterodyne reception.

For example, in case the intermediate frequency signals IF1 and IF2 are modulated in PSK (Phase Shift Keying) form, a constant voltage signal can be obtained by inputting the intermediate frequency signals IF1 and IF2 to corresponding frequency detectors 2-A and 2-B after doubling each of the frequencies to recover the carrier frequencies using conventional doubler circuits.

However, the above conventional circuit has a disadvantage caused by a special characteristic of double balanced mixers.

FIG. 2 illustrates an example of a frequency-voltage conversion characteristic of a frequency detector using a double balanced mixer plotted for four different input signal powers. Assume that this frequency detector has a 1900 MHz zero-crossing frequency characteristic.

As shown in FIG. 2, if the inputted signal power is changed by the polarization status in a light wave path (i.e. in an optical glass fiber), the output voltage is also changed even if at the same frequencies. Therefore, the detection characteristic of the frequency detector is influenced by the polarization condition and it is difficult to maintain the stability of the above mentioned voltage signal output by the conventional automatic frequency control circuit under different polarization conditions.

OBJECTS AND SUMMARY OF THE INVENTION

An object of the present invention is to provide a more accurate automatic frequency control circuit utilized in an optical heterodyne receiver using the polarity diversity technique. In detail, the object of the present invention is to provide an automatic frequency control circuit which is less influenced by fluctuations in the input signal power.

A further object of the present invention is to provide an automatic frequency control circuit which is applicable to many modulation techniques including PSK Phase Shift Keying or FSK Frequency Shift Keying optical heterodyne reception.

To accomplish these and other object, the present invention provides an automatic frequency control circuit which comprises first and second power control circuits for regulating inputted first and second intermediate frequency signals respectively, first and second frequency detectors each of which converts the frequency of respective regulated intermediate frequency signals to corresponding voltage signals, first and second comparator circuits each of which outputs a logic signal based on a respective comparison between a regulated intermediate frequency signal and a reference signal, a first switch which controls the output from the first frequency detector in response to the logic signal from the first comparator circuit, a second switch which controls the output from the second frequency detector in response to the logic signal from the second comparator circuit, an AND gate which outputs a control signal based on an AND operation on the logic signals from said first and second comparator circuits, and an inverting amplifier for generating an error signal output having a dc voltage by comparing a reference voltage and sum of the voltage signals from said first and second frequency detectors, the inverting amplifier changing its amplification factor in response to the control signal from the AND gate.

Further it could be possible in accordance with the invention to add an appropriate alert circuit which generates an alert signal in response to an OR operation on the logic signals from the first and second control circuits.

BRIEF DESCRIPTION OF THE DRAWINGS

These and other features and advantages of the invention may be more completely understood from the following detailed description of the preferred embodiments of the invention with reference to the accompanying drawings in which.

DETAILED DESCRIPTION OF THE PREFERRED EMBODIMENT

Figure 1:
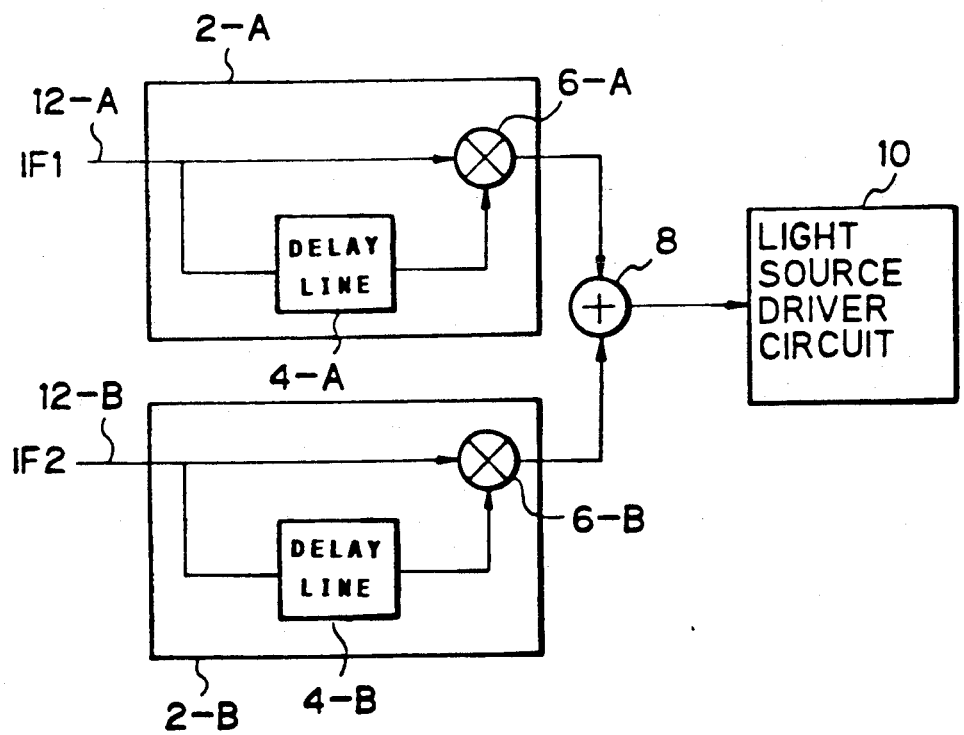
FIG. 1 illustrates an example of a general block diagram of a conventional automatic frequency control circuit for an optical heterodyne receiver using a polarization diversity technique.
Figure 2:
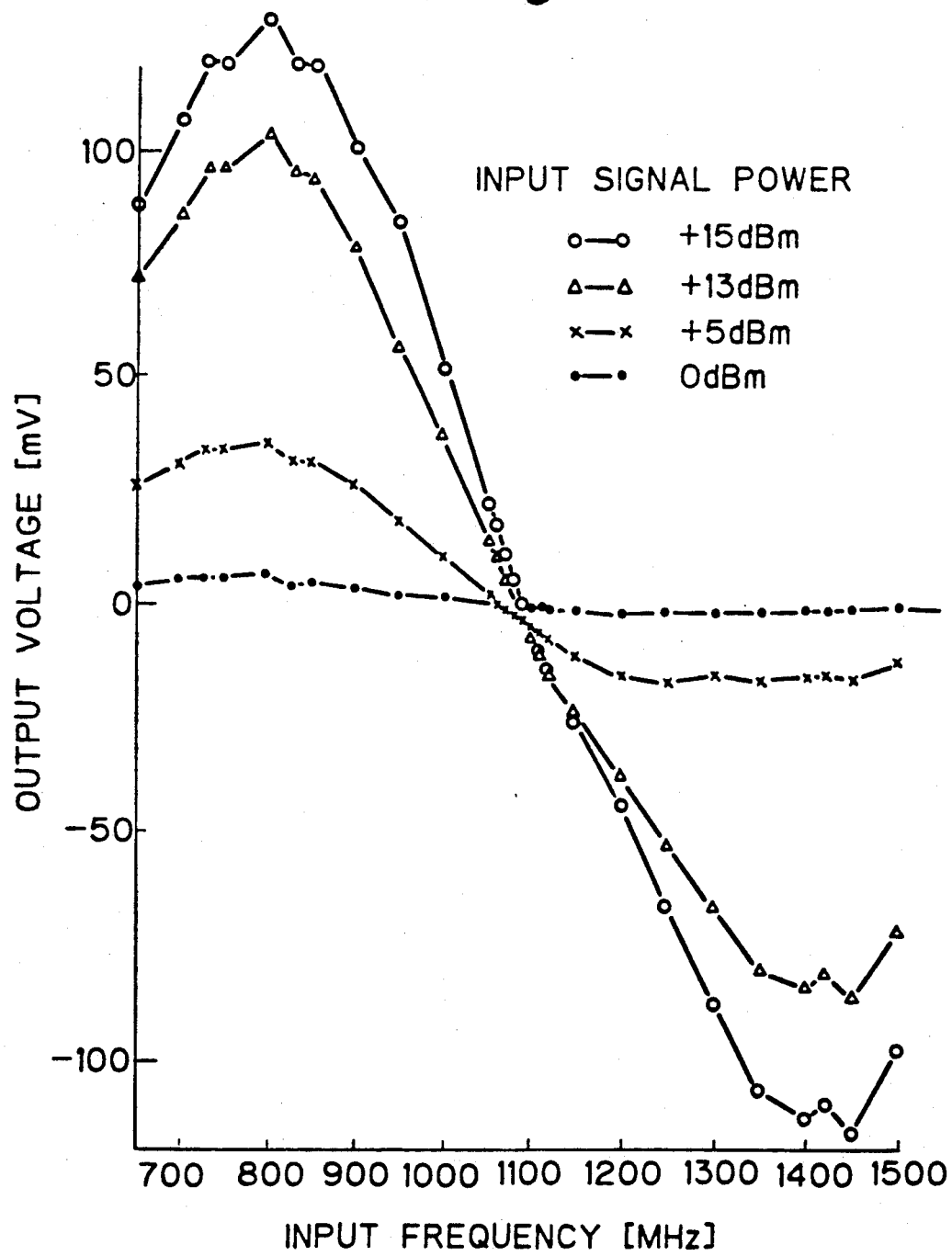
FIG. 2 illustrates a graph showing an example of a frequency-voltage conversion characteristic of a frequency detector using a double balanced mixer for four different input signal powers.
Figure 3:
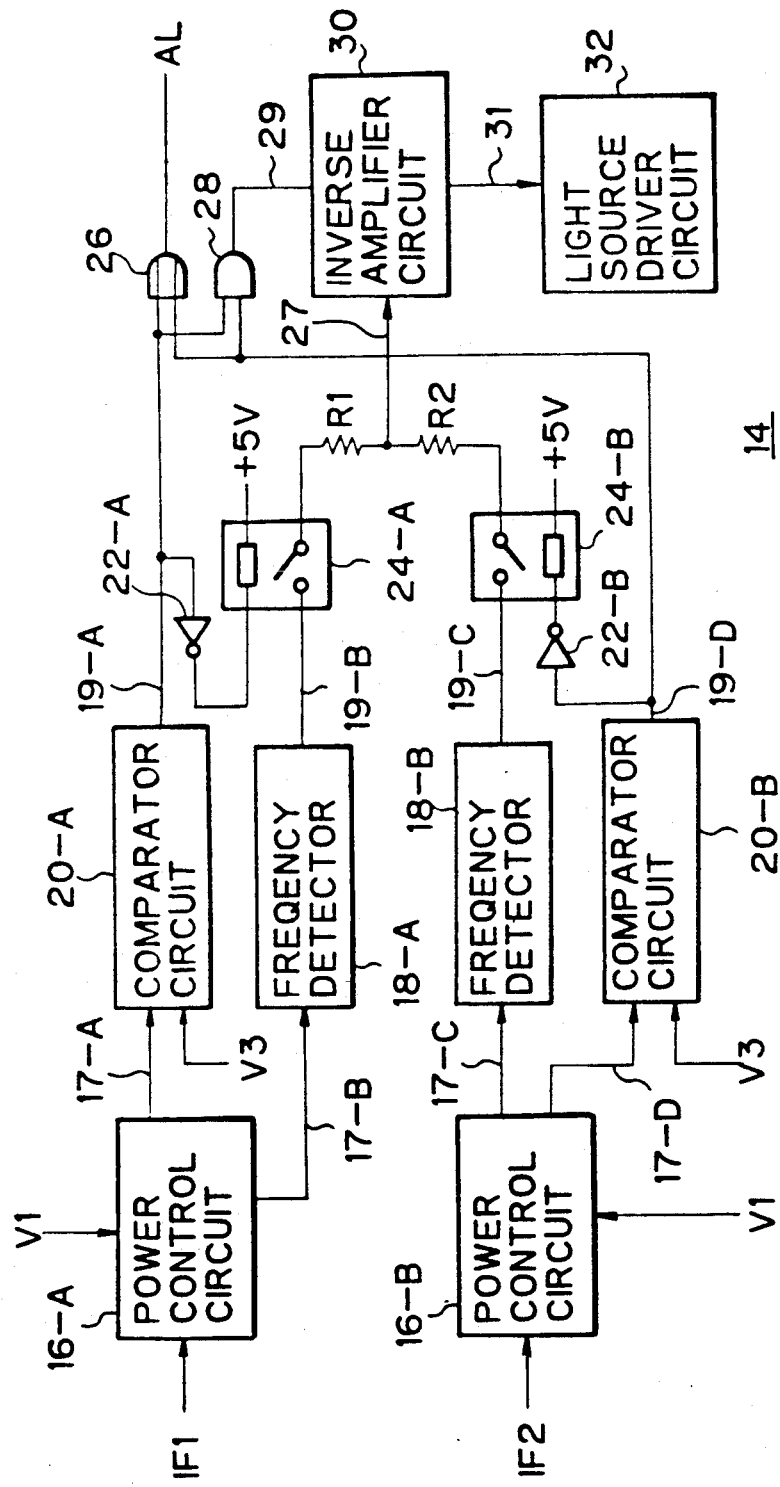
FIG. 3 illustrates a general block diagram of an automatic frequency control circuit according to the present invention.

FIG. 3 illustrates a general block diagram of an automatic frequency control circuit 14 according to the present invention.

A first intermediate frequency signal IF1 having signal power P01 and a second intermediate frequency signal IF2 having signal power P02 are applied to respective power control circuits 16-A and 16-B. Assume that each of the intermediate frequency signals IF1 and IF2 are generated from each of corresponding original light wave signals each of which have a different polarity from each other. Further, since both of the original signals are transmitted in a single optical fiber normally, those intermediate frequency signals IF1 and IF2 have the characteristic that the sum of both signals' power is substantially constant but the ratio of the powers is fluctuating all the time.

In the power control circuits 16-A and 16-B, fluctuation of the signal power of each of the inputted intermediate frequency signals IF1 and IF2 is regulated. The detailed circuit structure of the power control circuits 16-A and 16-B are disclosed in FIG. 4(a) and FIG. 4(b). Since both of the power control circuits have substantially the same circuit structure, the same circuit components have the same references numbers in FIG. 4(a) and FIG. 4(b).

Figure 4A:
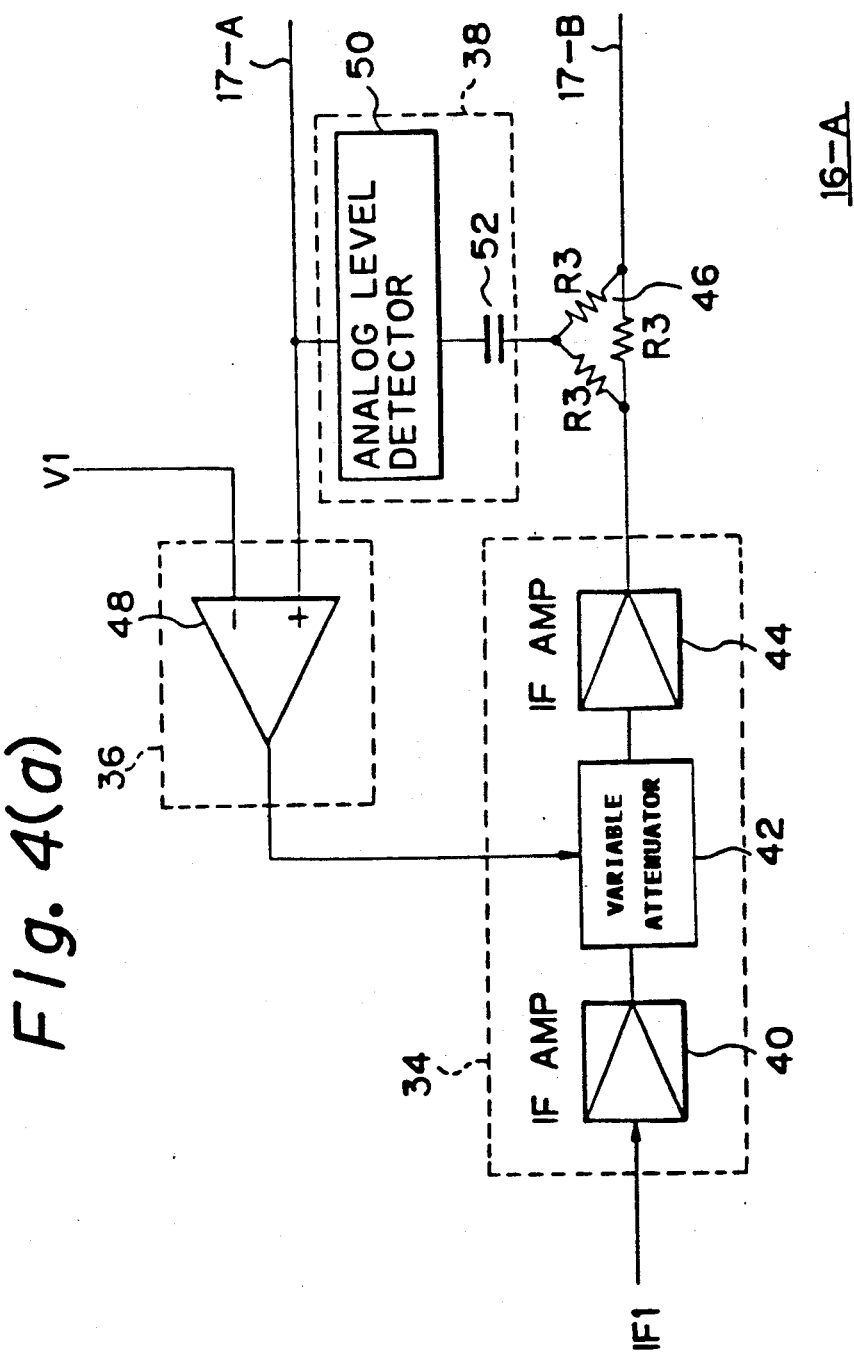
FIG. 4(a) illustrates a detailed block diagram of a power control circuit 16-A illustrated in FIG. 3.
Figure 4B:
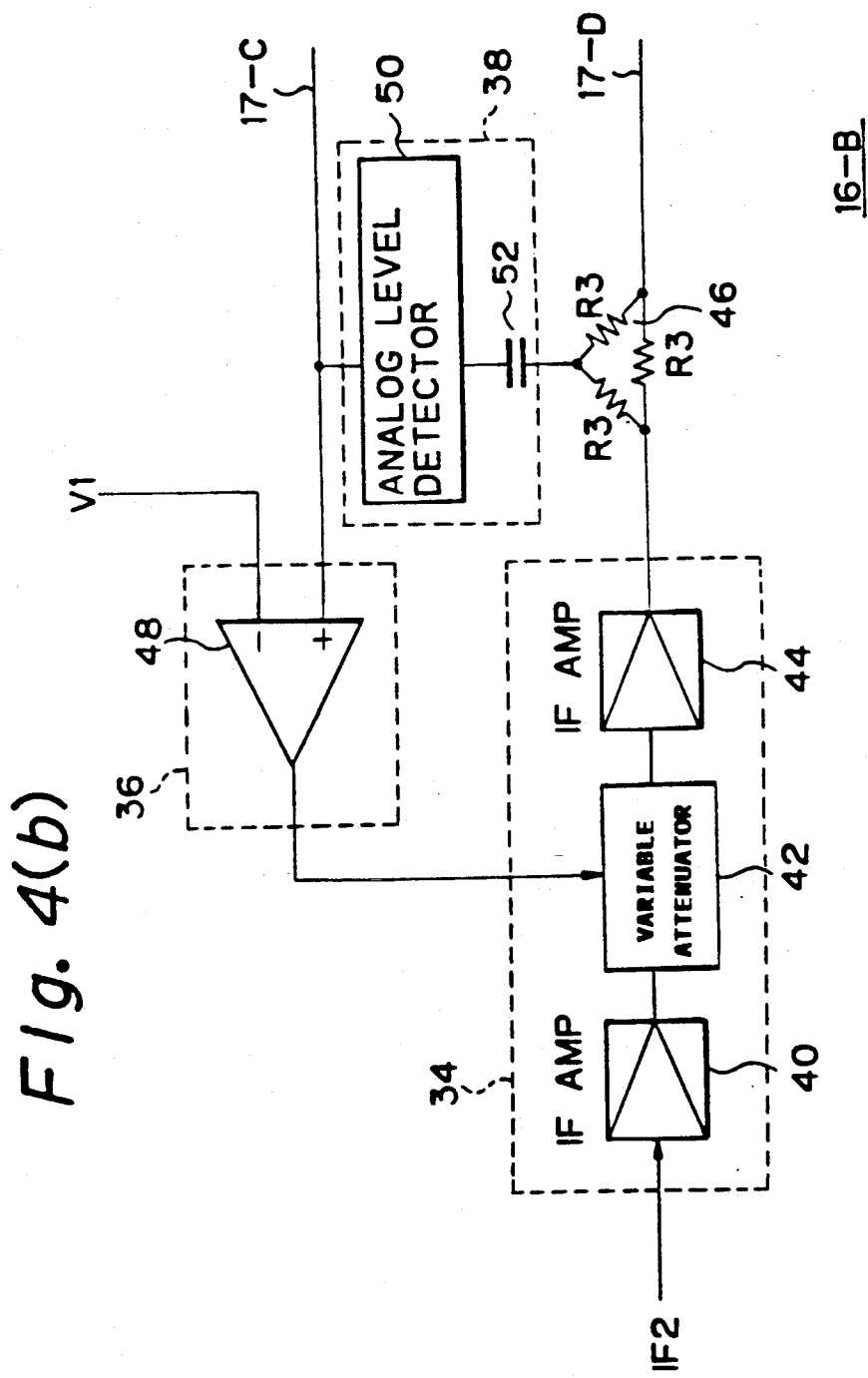
FIG. 4(b) illustrates a detailed block diagram of a power control circuit 16-B illustrated in FIG. 3.

For example, as shown in FIG. 4(a), the power control circuit 16-A is comprised of three main portions, a voltage amplifier 36, an automatic gain controller 34, and a level detector 38.

The voltage amplifier 36 is comprised of operational amplifier 48 whose negative input terminal is connected to a reference voltage V1. In this embodiment, voltage V1 is approximately 1.5 V.

The automatic gain controller 34 is comprised of the serial connection of two IF amplifiers 40, 44 and voltage controlled variable attenuator 42 provided between IF amplifiers 40 and 44. Further, voltage controlled variable attenuator 42 is controlled by the output of operational amplifier 48.

The level detector 38 is comprised of analog level detector 50 and capacitor 52. An output from analog level detector 50 is applied to a positive input terminal of operational amplifier 48 and to output line 17-A. The analog level detector 50 outputs a proposed voltage signal in response to inputted signal power. Further, power divider 46 comprising three equivalent resistors R3 is provided to divide the output from the automatic gain controller 34 into an output signal to output line 17-B and an input signal to the level detector 38 under the same impedance condition.

The above mentioned components in power control circuits 16-A and 16-B could be comprised of one or several known electronic parts. For example, the IF amplifiers 40 and 44 could be realized by WJ-A36 and WJ-A39 amplifiers respectively made by WATKINS-JOHNSON CO., LTD. The voltage controlled variable attenuator 42 could be a UTF-035 attenuator made by AVANTEK CO., LTD. Further, the analog level detector 50 could be a PPD-2001 level detector made by AVANTEK CO., LTD.

In the above mentioned power control circuit 16-A, automatic gain controller 34, level detector 38, and voltage amplifier 36 form an automatic gain control loop.

In detail, an output from automatic gain controller 34 is detected in level detector 38 and fed back to voltage controlled variable attenuator 42 via operational amplifier 48. In other words, the difference between the reference voltage V1 and the output from level detector 38 drives voltage controlled variable attenuator 42. First, the automatic gain controller 34 receives intermediate frequency signal IF1 having signal power P01 and outputs a regulated intermediate frequency signal IF1 having a regulated power P1. Second, level detector 38 detects the signal power P1 and converts it into an output voltage V0. The output voltage V0 changes according to the inputted power P1. In this embodiment, the output voltage V0 is changed around 0.4 V.

The operational amplifier 48 compares the reference voltage V1 and the output voltage V0, and controls voltage controlled variable attenuator 42 based on the comparison. As a result, the signal power of the intermediate frequency signal IF1 is regulated in signal power P1.

Similarly, power control circuit 16-B receives intermediate frequency signal IF2 having signal power P02 and outputs a regulated intermediate frequency signal IF2 having regulated power P2.

Figure 5A:
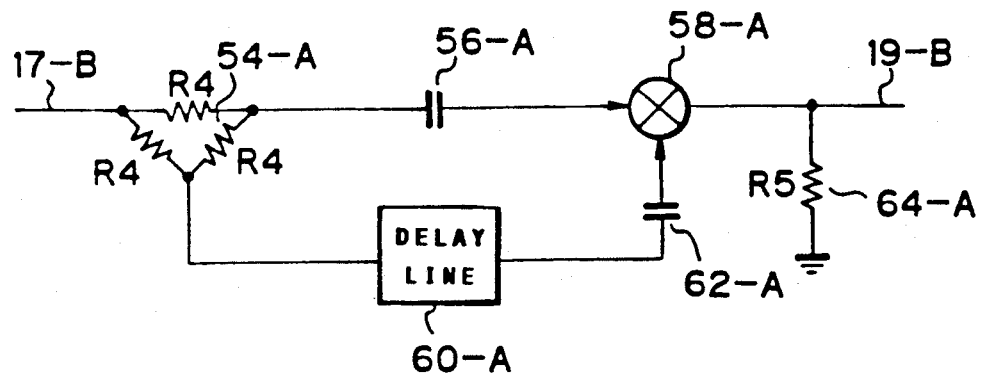
FIG. 5(a) illustrates a detailed circuit diagram of a frequency detector 18-A illustrated in FIG. 3.
Figure 5B:
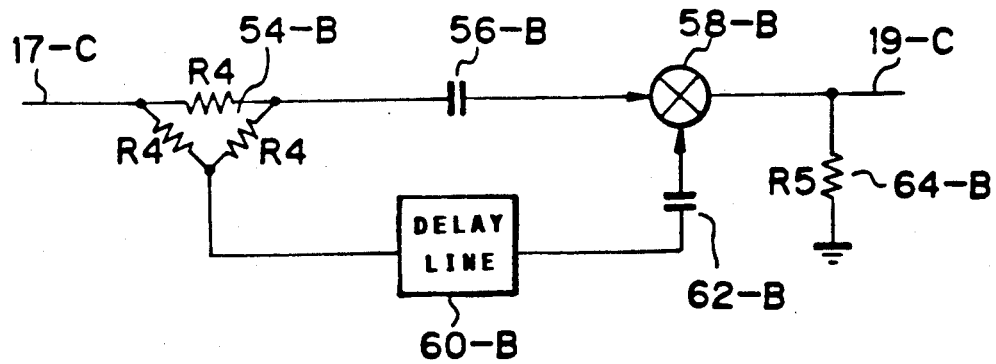
FIG. 5(b) illustrates a detailed circuit diagram of a frequency detector 18-B illustrated in FIG. 3.

Each of the regulated intermediate frequency signals IF1 and IF2 are applied to respective frequency detectors 18-A and 18-B. As shown in FIG. 5(a) and FIG. 5(b), both of frequency detectors 18-A and 18-B have substantially the same circuit structure. For example, as shown in FIG. 5(a), the output from power control circuit 16-A is applied to output line 17-B and divided by power divider 54-A comprising three equivalent resistors R4. One of the divided signals is applied to a double balanced mixer 58-A via a capacitor 56-A and the other signal is delayed in delay line 60-A and applied to double balanced mixer 58-A via a capacitor 62-A.

Because a delay interval in delay line 60-A is longer than a modulation interval of inputted signal IF1, a continuous voltage signal V2-A can be obtained at a resistor 64-A (R5) on an output line 19-B, whose magnitude is proportional to a frequency of inputted signal IF1.

Similarly, the regulated intermediate frequency signal IF2 is converted to a continuous voltage signal V2-B whose magnitude is proportional to a frequency of inputted signal IF2.

As a result, voltage signal V2-A is applied to a relay 24-A and voltage signal V2-B is applied to a relay 24-B (see FIG. 3).

On the other hand, the output signals from two of the level detectors 50 of power control circuits 16-A and 16-B are applied to corresponding comparator circuits 20-A and 20-B via output lines 17-A and 17-D respectively (see FIG. 3).

Figure 6A:
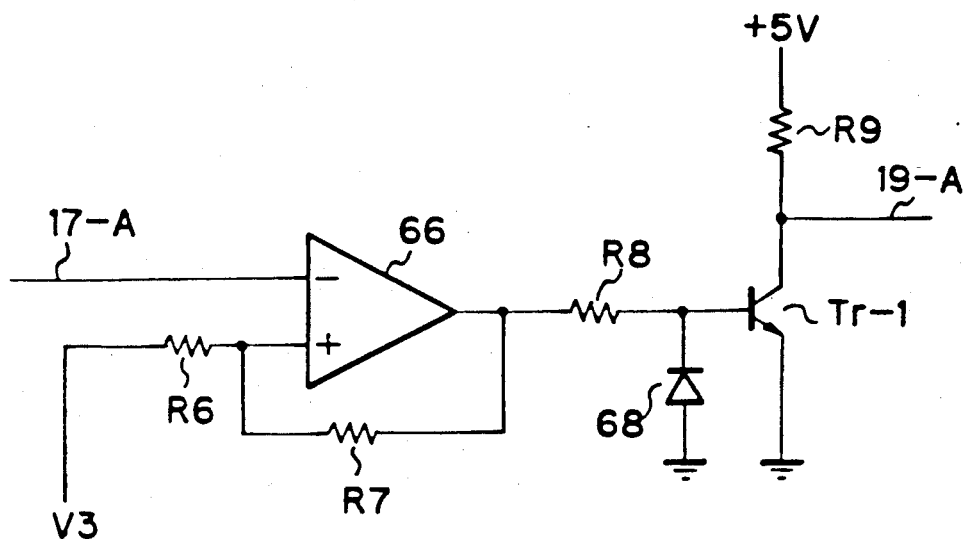
FIG. 6(a) illustrates a detailed circuit diagram of a comparator circuit 20-A illustrated in FIG. 3.
Figure 6B:
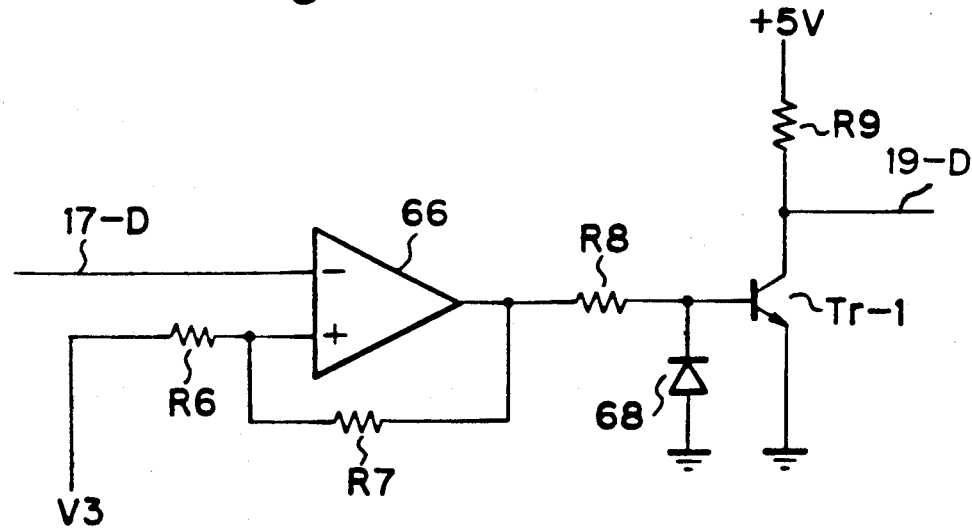
FIG. 6(b) illustrates a detailed circuit diagram of a comparator circuit 20-B illustrated in FIG. 3.

As illustrated in FIG. 6(a) and FIG. 6(b), both comparator circuit 20-A and 20-B have substantially the same circuit structure. For example, comparator circuit 20-A comprises operational amplifier 66 whose negative input terminal is connected to output line 17-A and positive input terminal is connected to a reference voltage V3 via resistor R6. In this embodiment, the amount of reference voltage V3 is approximately 0.4 V.

The output of operational amplifier 66 is fed back to the positive input terminal via resistor R7. Further, the output from operational amplifier 66 drives the base of transistor Tr-1 via resistor R8. The base is protected by diode 68.

The collector of transistor Tr-1 is pulled up by a TTL level (+5 V) voltage source via resistor R9 and an emitter of the transistor is grounded. An output of comparator circuit 20-A is extracted from the emitter on output line 19-A. Therefore, as a result, the logical result of the comparison in operational amplifier 66 is inverted.

In detail, if the above mentioned level detector 38 outputs a voltage signal (V0) which is larger than the reference voltage V3 (0.4 V), comparator circuit 20-A outputs a "L" logic level (0 V) signal. On the other hand, if the above mentioned level detector 38 outputs a voltage signal (V0) which is smaller than the reference voltage V3 (0.4 V), comparator circuit 20-A outputs an "H" logic level (+5 V) signal.

Similarly, an output from comparator circuit 20-B is applied to output line 19-B and if the above mentioned level detector 38 outputs a voltage signal (V0) which is larger than the reference voltage V3 (0.4 V), comparator circuit 20-B outputs a "L" logic level (0 V) signal. On the other hand, if the above mentioned level detector 38 outputs a voltage signal (V0) which is smaller than the reference voltage V3 (0.4 V), comparator circuit 20-B outputs an "H" logic level (0 V) signal.

The output voltage ("H" or "L" level) signals control corresponding relays 24-A and 24-B respectively via corresponding NOT gates 22-A and 22-B (see FIG. 3).

Since NOT gates 22-A and 22-B are connected to the voltage source (+5 V) via electric coils, if one of the comparator circuits outputs a "H" level signal (+5 V), the output is reversed to 0 V and the corresponding relay turns ON. As a result, the circuit in the relay is closed.

Figure 7:
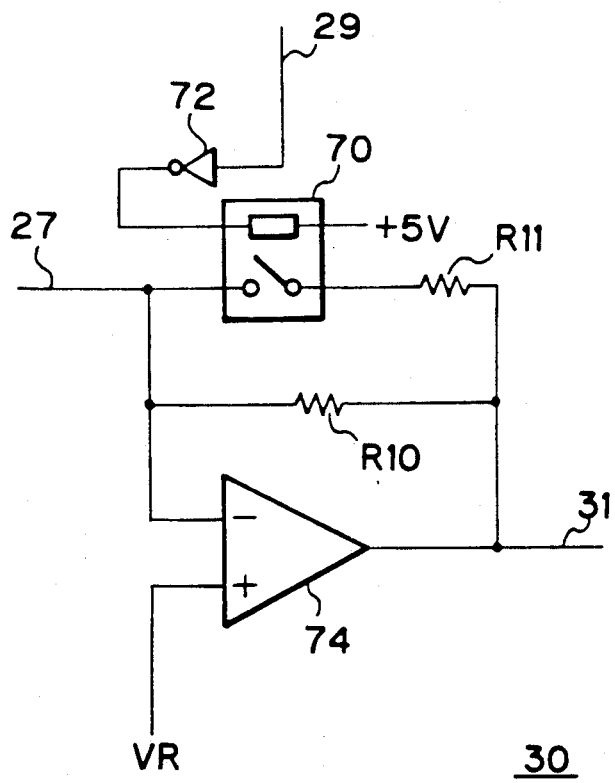
FIG. 7 illustrates a detailed circuit diagram of an inverse amplifier circuit 30 illustrated in FIG. 3.

In case both relays 24-A and 24-B are "ON", the outputs from frequency detectors 18-A and 18-B are applied to inverse amplifier circuit 30 via output line 27 and respective resistors R1 and R2. As shown in FIG. 7, inverse amplifier circuit 30 comprises operational amplifier 74 and a relay 70 for changing the amplification factor of operational amplifier 74.

The positive input terminal of operational amplifier 74 is connected to a reference voltage source VR and the negative input terminal thereof is connected to an output of operational amplifier 74 via "parallelly" connected resistors R10 and R11.

The relay 70 is provided between resistor R11 and the negative input terminal of operational amplifier 74 and further, output line 27 is connected to the negative input terminal. The relay 70 is driven by AND gate 28 via an output line 29 and a NOT gate 72 (see FIG. 3). Further, AND gate 28 is driven by outputs (TTL level, +5 V) from comparator circuits 20-A and 20-B via output lines 19-A and 19-D.

Further, both outputs from comparator circuits 20-A and 20-B are applied to OR gate 26 to obtain an alarm output AL for detecting a serious error, such as a breaking of the optical fiber.

In conclusion, the above mentioned ON/OFF status of the relays and output lines can be described in the following table:

TABLE 1

| Reference numbers of output lines or relays: | | | | | | | | |
|---|---|---|---|---|---|---|---|---|
| 17-A | 17-D | 19-A | 19-D | 29 | AL | 24-A | 24-B | 70 |
| >V3 | >V3 | H | H | H | H | ON | ON | ON |
| >V3 | <V3 | H | L | L | H | ON | OFF | OFF |
| <V3 | >V3 | L | H | L | H | OFF | ON | OFF |
| <V3 | <V3 | L | L | L | L | OFF | OFF | OFF |

In this table, "H" means "H"igh logic level (+5 V) status and "L" means "L"ow (0 V) logic level status. Further, "ON" means that the circuit in the relay is closed and "OFF" means that the circuit in the relay is opened.

Figure 8:
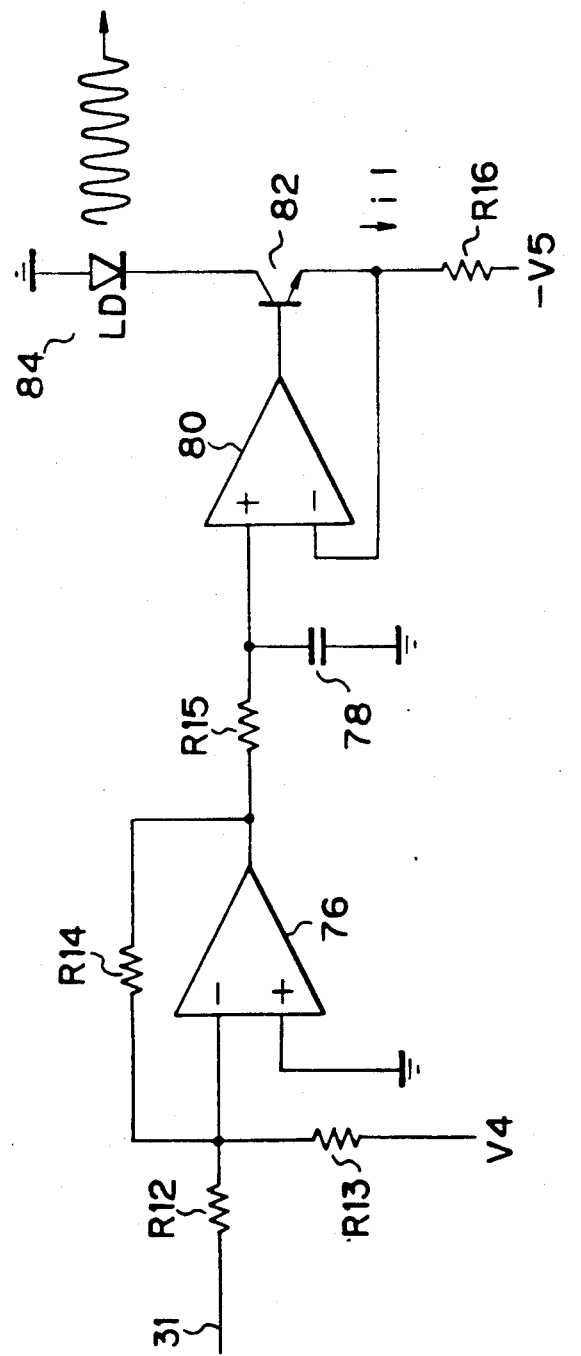
FIG. 8 illustrates a detailed circuit diagram of a light source driver circuit 32 illustrated in FIG. 3.

The output of inverse amplifier circuit 30 is applied to light source driver circuit 32 via an output line 31. As shown in FIG. 8, light source driver circuit 32 comprises serially connected operational amplifiers 76 and 80, which control the operating current i1 in laser diode 84 (LD) in response to the applied voltage on output line 31.

In detail, output line 31 is connected to the negative input terminal of operational amplifier 76 via resistor R12. Further, the negative input terminal of the operational amplifier 76 is connected to a reference voltage source V4 via resistor R13. The positive input terminal of operational amplifier 76 is grounded. The output of operational amplifier 76 is fed back to the negative input terminal thereof via resistor R14.

The output from operational amplifier 76 is also applied to the positive input terminal of the other operational amplifier 80 via resistor R15. Further, the positive input terminal of operational amplifier 80 is AC grounded via capacitor 78.

The output from operational amplifier 80 is applied to the base of driver transistor 82. The emitter of driver transistor 82 is connected to the negative input terminal of operational amplifier 80. Further, the emitter is connected to a negative voltage source −V5 via resistor R16.

A collector of driver transistor 82 is connected to the anode of laser diode 84 (LD) whose cathode is grounded. The laser diode 84 changes its oscillating frequency in response to the amount of operating current i1.

The light source driver circuit 32 directly controls the operating current i1 by means of controlling the base potential of driver transistor 82. In detail, since resistors R12, R13, and R14 are substantially equal, the current i1 is normally represented as −V4/R16. If there comes a voltage Vin on the output line 31, the current i1 becomes −(Vin+V4)/R9. The resistor R15 and capacitor 78 form a low-pass filter.

Therefore, it is possible to control the oscillating frequency of laser diode 84 by selecting the necessary reference voltage V4, negative voltage −V5, and other circuit parameters.

The following explains the detailed operation of this embodiment.

Figure 9:
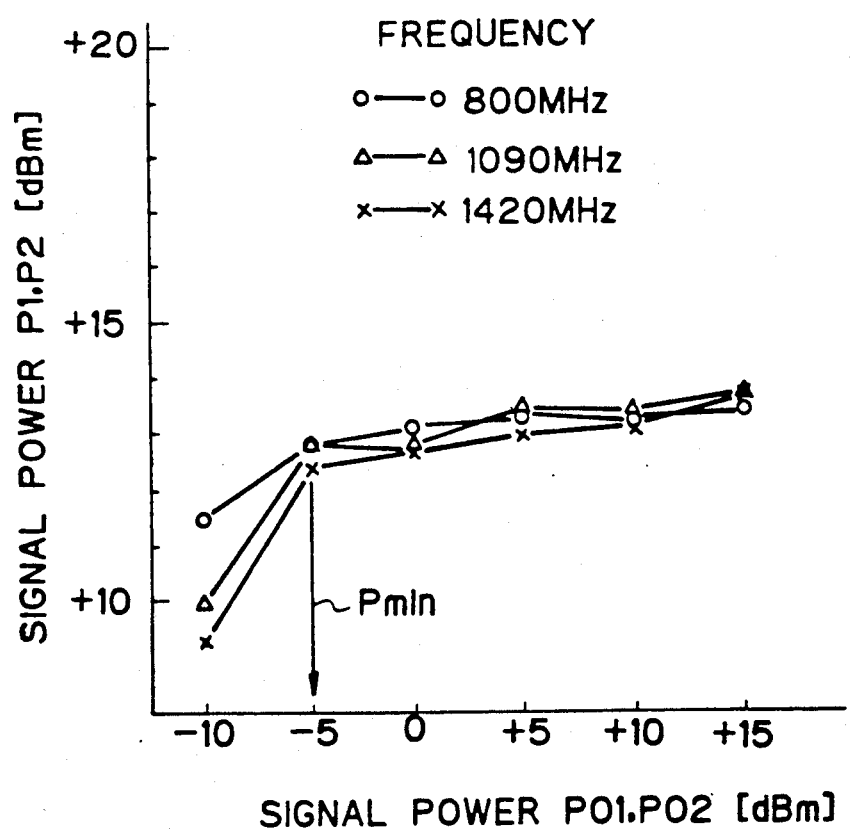
FIG. 9 illustrates a graph showing a signal power control characteristic of the power control circuits 16-A and 16-B illustrated in FIG. 3.

At first, assume that Pmin is the minimum signal power which can produce the regulated signal power P1 (or P2) at the output lines 17-A or 17-D of power control circuits 16-A or 16-B. As shown in FIG. 9, according to our experiment, power control circuits 16-A and 16-B can obtain enough constant signal power P1, P2 (approximately, +13 dBm) on output lines 17-B and 17-C where inputted intermediate frequency signals IF1 and IF2 have more than −5 dBm signal power. Therefore, Pmin is approximately −5 dBm in this embodiment.

If intermediate signal IF1 has a signal power PO1 which is larger than Pmin, comparator circuit 20-A outputs a "H"igh level signal and an output from frequency detector 18-A is applied to inverse amplifier circuit 30 via resistor R1. Further, because the sum of the signal power PO1 and PO2 of intermediate signals IF1 and IF2 is substantially constant, intermediate frequency signal IF2 has a signal power PO2 which is smaller than Pmin in many cases.

Therefore, in that case, comparator circuit 20-B outputs a "L"ow level signal and output from frequency detector 18-B is not applied to inverse amplifier circuit 30.

As a result, an output voltage from inverse amplifier circuit 30 (on the output line 31) becomes:

$$-G1(\text{"V2-A"}-VR). \qquad (1)$$

(G1: gain of the inverse amplifier circuit, G1=R10/R1)

Similarly, where the intermediate frequency signal IF2 has a signal power PO2 which is larger than the minimum signal power Pmin, the output voltage from inverse amplifier circuit 30 (on the output line 31) becomes:

$$-G2(\text{"V2-B"}-VR). \qquad (2)$$

(G2: gain of the inverse amplifier circuit, G2=R10/R2)

If both intermediate signals IF1 and IF2 have signal power which is larger than Pmin, both relays 24-A and 24-B becomes "ON" and output voltage from the inverse amplifier circuit 30 (on the output line 31) becomes:

$$-G3(\text{"V2-A"}-VR)/R1+(\text{"V2-B"}-VR)/R2). \qquad (3)$$

(G3: gain of the inverse amplifier circuit:

$$G3=(R10*R11)/(R10+R11))$$

In this case, relay 70 in inverse amplifier circuit 30 turns "ON", and feedback resistor R10 is connected in parallel to resistor R11. Therefore, where R1=R2=Ra, and R10=R11=Rb, the above mentioned formulas become as follows:

$$(1)= -Rb/Ra(\text{"V2-A"}-VR) \qquad (4)$$

$$(2)= -Rb/Ra(\text{"V2-B"}-VR) \qquad (5)$$

$$(3)= -Rb/Ra((\text{"V2-A"}+\text{"V2-B"})/2-VR) \qquad (6)$$

As a result, there can be obtained a constant gain G=Rb/Ra of inverse amplifier circuit 30 and it is possible to obtain an averaged voltage output from inverse amplifier circuit 30 at any power ratio between intermediate frequency signals IF1 and IF2.

Figure 10:
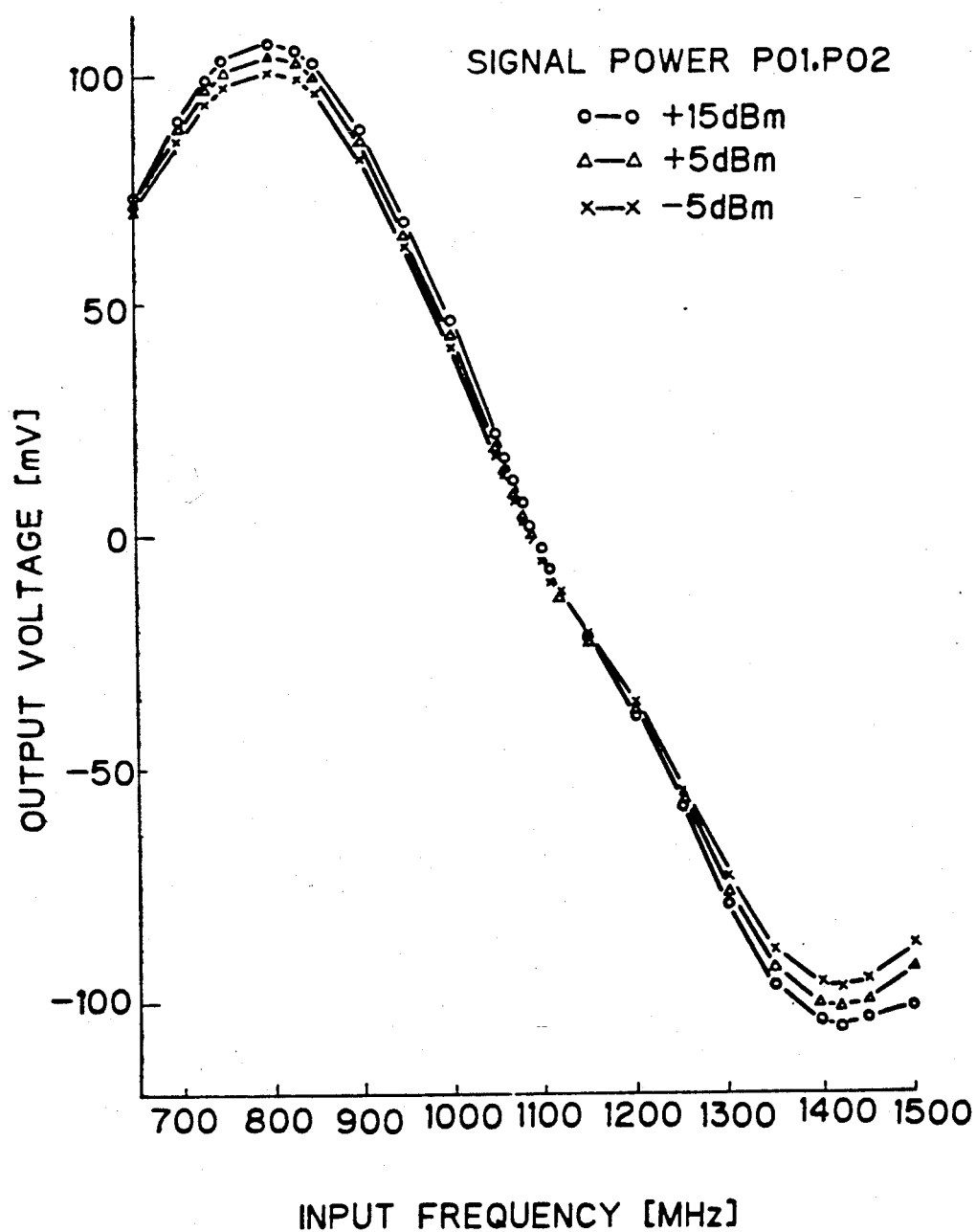
FIG. 10 illustrates a graph showing a frequency-voltage conversion characteristic of the frequency detectors 18-A and 18-B illustrated in FIG. 3.

Further, as shown in FIG. 10, frequency detectors 18-A and 18-B according to the present invention obtain a substantially constant frequency-voltage conversion characteristic by means of the combination with respective power control circuits 16-A and 16-B.

As a result, there is obtained a substantially constant voltage signal at output line 31 for any power ratio between intermediate frequency signals IF1 and IF2.

Further, if both of the signal powers P1 and P2 are smaller than the signal power Pmin, both comparator circuits 20-A and 20-B output "L" level signals and the alarm output Al becomes "L"ow level. This situtation is only caused by a serious error. For example, if the optical fiber on which an original signal of the intermediate frequency signals IF1 and IF2 is transmitted is broken, both signal powers PO1 and PO2 become zero. In other cases, because at least one of the comparator circuit outputs a "H"igh level signal, the alarm output AL never becomes "L"ow level.

This embodiment is subject to minor modifications. For example, automatic gain controller 34 could be realized by a limiter amplifier circuit. Further, comparator circuits 20-A and 20-B could be realized by other kind of various logic circuits. Still further, it may be possible to provide several relays at inverse amplifier circuit 30 to get a plurality of gains for operational amplifier 74.

As mentioned above, because each of the inputted intermediate frequency signals IF1 and IF2 are selected after frequency-voltage conversion in response to each of their signal powers, this circuit structure is applicable to many modulation forms, such as ASK (Amplitude Shift Keying), FSK (Frequency Shift Keying), and PSK (Phase Shift Keying) by preparing the necessary frequency detectors.

Further, according to the present invention, even if using conventional frequency detectors including double balanced mixers, it is possible to obtain a stable frequency-voltage conversion characteristic because both frequency detectors are used with corresponding power control circuits.

Therefore, as mentioned above, it is possible to realize an accurate frequency control circuit for an optical heterodyne receiver using polarization diversity.

What is claimed is:

1. In an optical heterodyne receiver having a local oscillating light source whose frequency is controlled by a driver circuit, the receiver using a polarity diversity technique which produces first and second intermediate frequency signals, an atumoatic frequency control circuit for controlling the driver circuit with an error signal generated from the first and second intermediate frequency signals, said automatic frequency control circuit comprising:

first and second power regulation means for generating respective fixed power signals based on the first and second intermediate frequency signals;

first and second detector means for converting the respective fixed power signals to corresponding voltage signals based on the frequency of each of the fixed power signals;

first and second control means for providing respective logic signals based on the respective fixed power signals;

first switching means for enabling/disabling the first detector means in response to the logic signal from the first control means;

second switching means for enabling/disabling the second detector means in response to the logic signal from the second control means;

third control means for generating an AND signal based on the logic signals from said first and second control means; and amplifier means for generating the error signal by comparing a reference voltage and the voltage signals from said first and second detector means, said amplifier means changing an amplification factor in response to the AND signal from the third control means.

2. An automatic frequency control circuit according to claim 1, wherein said automatic frequency control circuit further comprises:

alert means for generating an alert signal in response to at least one of the logic signals from the first and second control means.

3. In an optical heterodyne device having a local oscillating light source controlled by a driver circuit, the device using a polarity diversity technique which produces first and second intermediate frequency signals, an automatic frequency control circuit for controlling the driver circuit with an error signal generated from the first and second intermediate frequency signals, said automatic frequency control circuit comprising:

first and second power control circuits each of which outputs a fixed power signal respectively based on each of the first and second intermediate frequency signals;

first and second frequency detectors each of which converts a frequency of a respective fixed power signal to a corresponding voltage signal;

first and second control circuits each of which outputs a logic signal based on a respective fixed power signal;

a first switch circuit which enables/disables the first frequency detector in response to the logic signal from the first control circuit;

a second switch circuit which enables/disables the second frequency detector in response to the logic signal from the second control circuit;

a third control circuit which generates an AND signal based on the logic signals from said first and second control circuits; and an inverting amplifier circuit for generating the error signal by comparing a reference voltage and the voltage signals from said first and second frequency detectors, said inverting amplifier circuit changing an amplification factor in response to the AND signal from the third control circuit.

4. An automatic frequency control circuit according to claim 3, wherein said automatic frequency control circuit further comprises:

an alert circuit which generates an alert signal in response to at least one of the logic signals from the first and second control circuits.

* * * * *